United States Patent [19]

Horth et al.

[11] Patent Number: 5,386,900
[45] Date of Patent: Feb. 7, 1995

[54] ADJUSTABLE INFEED DESIGN

[75] Inventors: Roland D. Horth, Conifer; Ronald G. Knaub, LaSalle, both of Colo.

[73] Assignee: Aluminum Company of America, Pittsburgh, Pa.

[21] Appl. No.: 111,997

[22] Filed: Aug. 25, 1993

[51] Int. Cl.[6] ............................................. B65G 11/00
[52] U.S. Cl. ................................. 193/2 R; 198/836.3; 406/191; 193/38
[58] Field of Search ............ 193/1, 2 R, 25 R, 25 FT, 193/38, 2 A, 25 C; 198/836.1, 836.3, 836.4; 406/191, 193, 195, 198

[56] References Cited

U.S. PATENT DOCUMENTS

| | | |
|---|---|---|
| 752,341 | 2/1904 | Hopkins et al. |
| 2,720,302 | 10/1955 | Madden ............................ 193/2 R |
| 3,032,160 | 1/1960 | Kay et al. |
| 3,313,400 | 5/1965 | Johnson |
| 3,325,131 | 6/1967 | Englander et al. |
| 3,511,360 | 5/1970 | Jagiel ........................... 198/836.3 X |
| 3,570,455 | 3/1971 | Laidman et al. |
| 3,647,051 | 3/1972 | Didas |
| 3,739,904 | 6/1973 | Windstrup ...................... 198/836.4 |
| 3,854,688 | 12/1974 | Shuford |
| 3,858,711 | 1/1975 | Barker ........................... 198/836.3 X |
| 3,874,497 | 1/1975 | Carlson |
| 4,795,018 | 1/1989 | Anderson |
| 5,211,280 | 5/1993 | Houde .............................. 198/836.3 |
| 5,291,988 | 3/1994 | Leonard .......................... 198/836.3 |

*Primary Examiner*—D. Glenn Dayoan
*Attorney, Agent, or Firm*—Tracey D. Beiriger; Thomas R. Trempus

[57] ABSTRACT

An adjustable can conveyor comprises a fixed trackwork assembly and a moveable trackwork assembly. The fixed trackwork assembly includes at least two outer collars, a can guide track and two guide rails. The moveable trackwork assembly includes at least two inner collars, a can guide track and two guide rails. An interlocking mechanism is used to secure the two trackwork assemblies together such that a track able to convey can bodies is created. The locking mechanism is adjustable such that the conveyor may be set up to move cans of varying length. Because of the interlocking mechanism used, the moveable trackwork assembly is completely supported by the fixed trackwork assembly during adjustments. Further, the four guide rails associated with both trackwork assemblies may be rotated in such a manner that allows for adjusting the conveyor for cans of varying diameter.

20 Claims, 5 Drawing Sheets

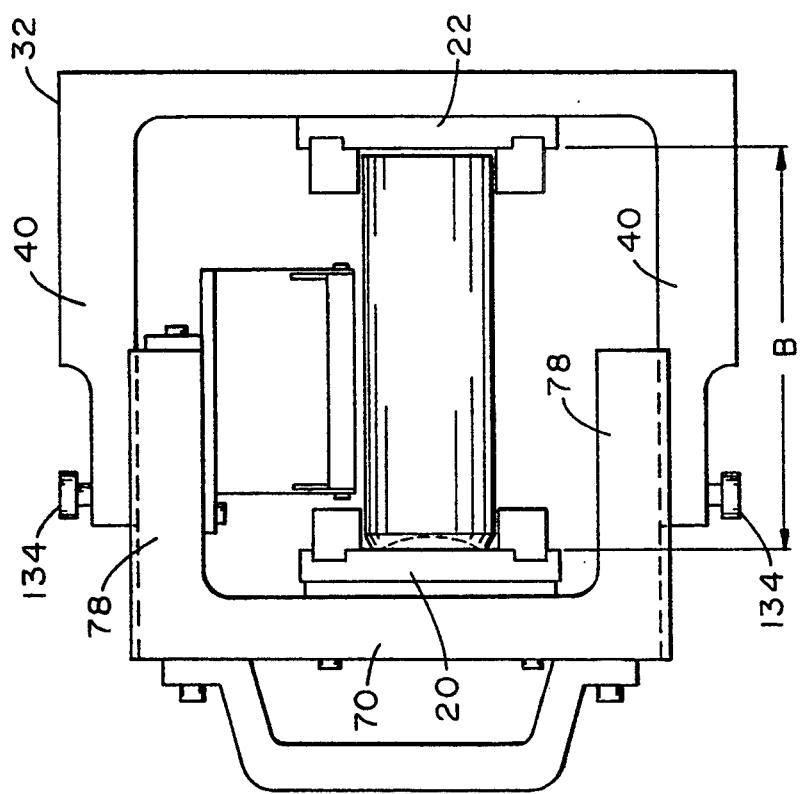
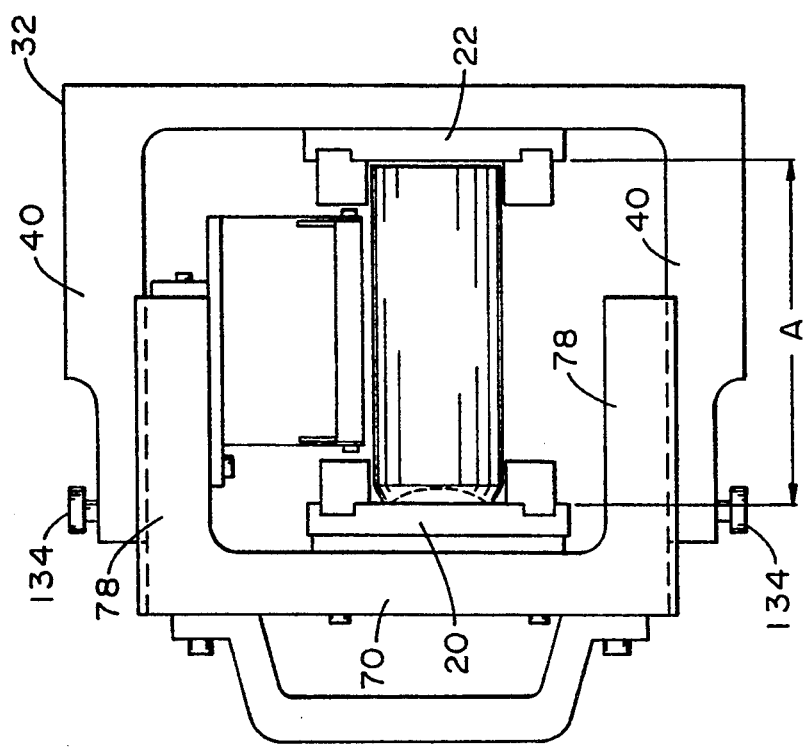

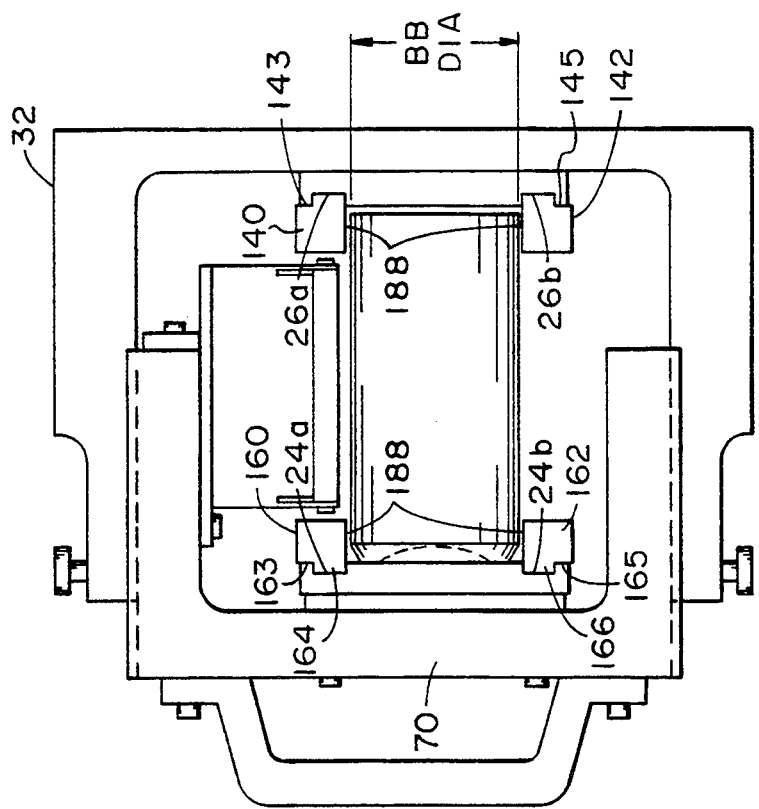
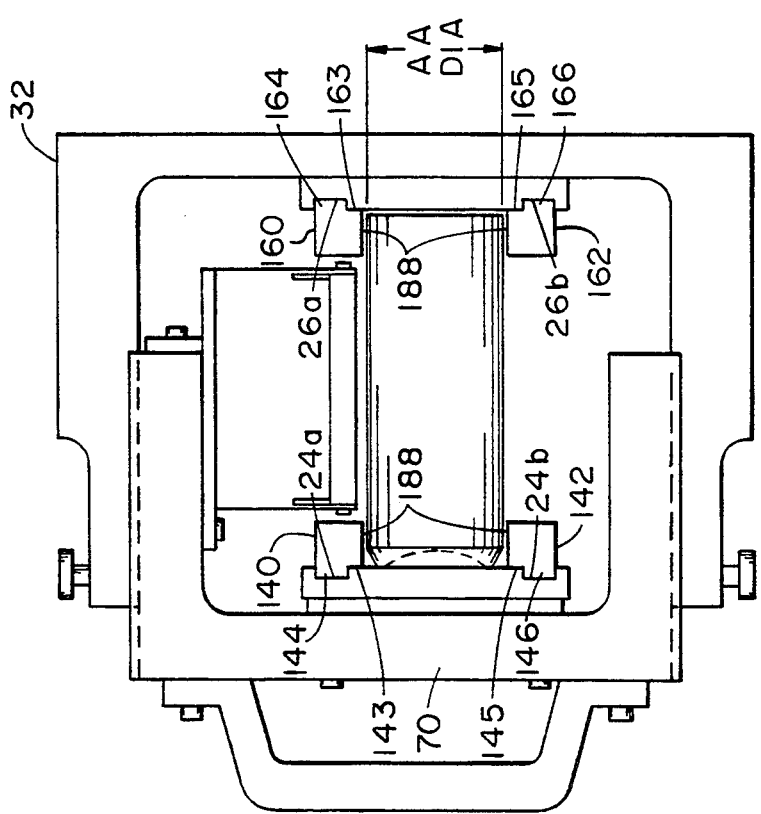

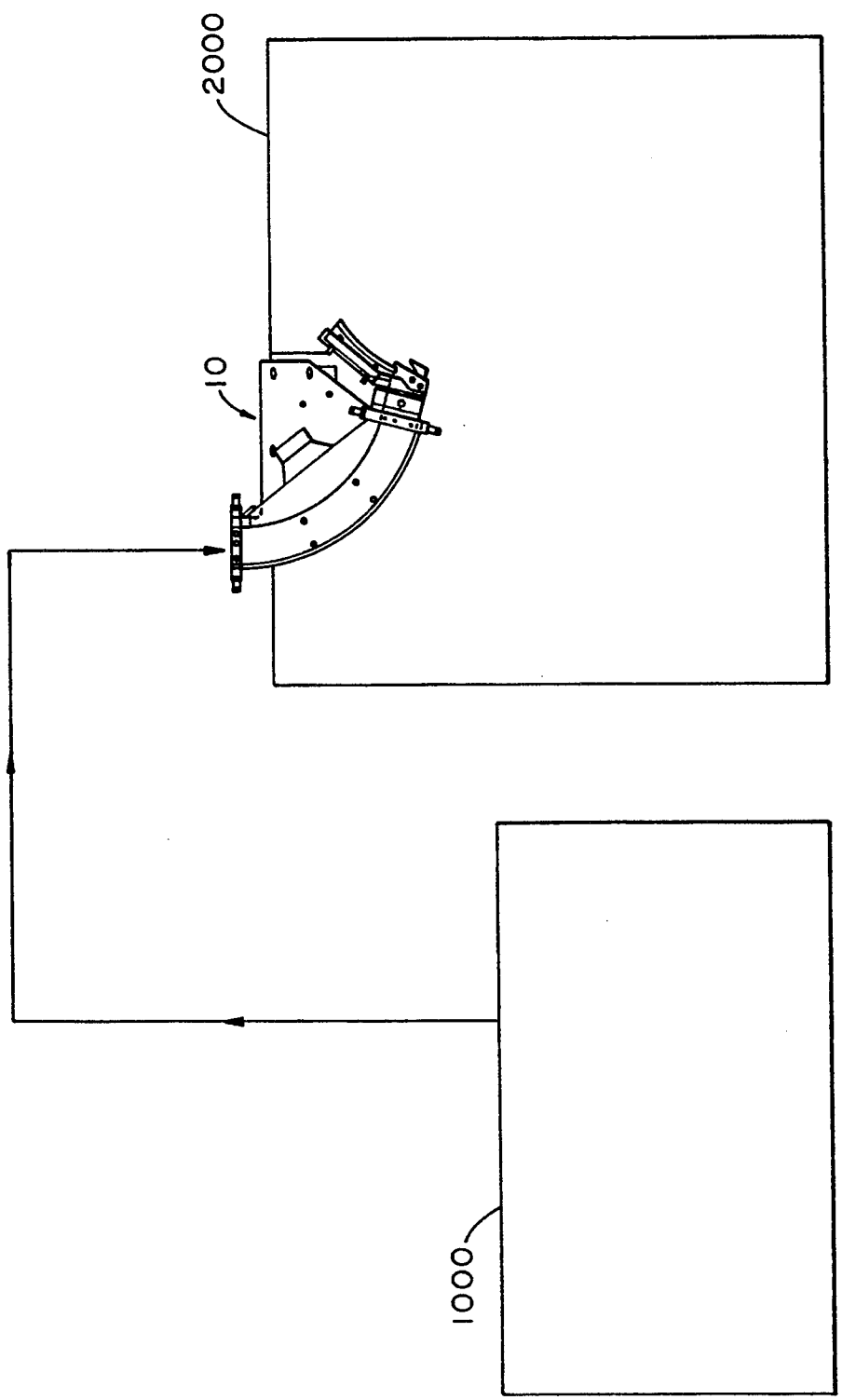

ADJUSTABLE INFEED DESIGN

FIELD OF THE INVENTION

This invention generally pertains to the art of transposing articles, and more particularly, to the transposing of can bodies during the can body manufacturing process. This invention provides an improved gravity feed conveyer apparatus that can easily and quickly be adjusted to convey cans of various heights and diameters.

BACKGROUND OF THE INVENTION

There is a constant need in the canning industry to increase productivity. Can conveyors are utilized in can bottling, can manufacturing and can decorating facilities to transport can bodies in a rapid, orderly and efficient manner between various operating stages. A conveyor which can be reconfigured to transport cans of differing sizes is known in the industry. Many conveyors often comprise adjustable rails and brackets to adapt the runway for various sized cans. However, such conveyors require extensive manipulation to achieve a change from one size can to another size can.

U.S. Pat. No. 4,795,018 to Anderson teaches a contained trackwork for can conveying in which guide rails can be adjusted to accommodate cans of different heights. During adjustment of the trackwork, it is necessary to remove multiple locking pins. This causes the trackwork to be totally unsupported and thus requires the operator to provide physical support for the trackwork while adjusting the conveyor for various can heights. This adjustment arrangement has proven awkward and inconvenient because of the time and difficulty involved when installing and adjusting trackwork for different height cans. For example, a typical can line into which such a conveyor is mounted transports cans at a rate of approximately 1600 cans per minute. In the beverage industry where cost competition depends primarily on speed and efficiency of production, ease of changeovers is an important feature. Thus, this type of arrangement is not ideal.

Other conventional conveyors have the drawback of being constrained to approximately 1000 cans per minute due to the configuration of the trackwork sections which can deflect cans from proper alignment. Even at low speed operation, conventional conveyors still often have misalignment problems requiring substantial time be spent during setup to attempt to prevent such misalignment. Further, many conventional conveyors have numerous adjustment bolts along each section that must be loosened and tightened to modify guide rail spacings for various height cans. Additionally, conventional conveyors usually cannot be adapted for can height and can diameter, rather they can only be adjustable for one or the other. Typically, existing arrangements for gravity feed can conveyors are somewhat limited in their suitability for high speed, low cost processing of light weight cans such as the various sized aluminum containers used by the beverage industry.

SUMMARY OF THE INVENTION

The present invention provides an adjustable can conveyor apparatus for transporting cans from one position to another position. The invention comprises a fixed trackwork assembly and a moveable trackwork assembly. The fixed trackwork assembly includes at least two outer collars, a can guide track and two guide rails. The moveable trackwork assembly includes at least two inner collars, a can guide track and two guide rails. An interlocking mechanism is used to secure the two trackwork assemblies together to define a contained track for high speed movement of rolling cans. The trackwork assemblies can easily be adjusted for both can height and can diameter. The defined track provides minimum satisfactory contact necessary to support cans while providing a continuous opening through which a misaligned can body may dislodge from the trackwork.

It is an object of the present invention to provide an improved can conveying device which can be adjusted in a fast, cost effective manner to accommodate cans of various height and diameter.

It is another object of the present invention to provide an improved gravity feed can conveying device which processes both sealed and unsealed cans at high rates.

It is yet another object of the present invention to provide a can conveying device which is relatively rigid and not prone to misalignment.

It is still another object of the present invention to provide a can conveying device comprising rigid support that facilitates the removal of misaligned cans.

BRIEF DESCRIPTION OF THE DRAWINGS

The above as well as other features and advantages of the invention will become apparent through consideration of several drawings in which:

FIGS. 3A and 3B are end views of the adjustable infeed conveyor illustrating how the design may be adjusted for cans of varying height;

FIGS. 4A and 4B are end views of the adjustable infeed conveyor illustrating how the design may be adjusted for cans of varying diameter; and FIG. 5 is a schematic diagram illustrating the adjustable infeed conveyor in use with a can body maker and a can decorator.

DETAILED DESCRIPTION OF THE INVENTION

Figure 1:
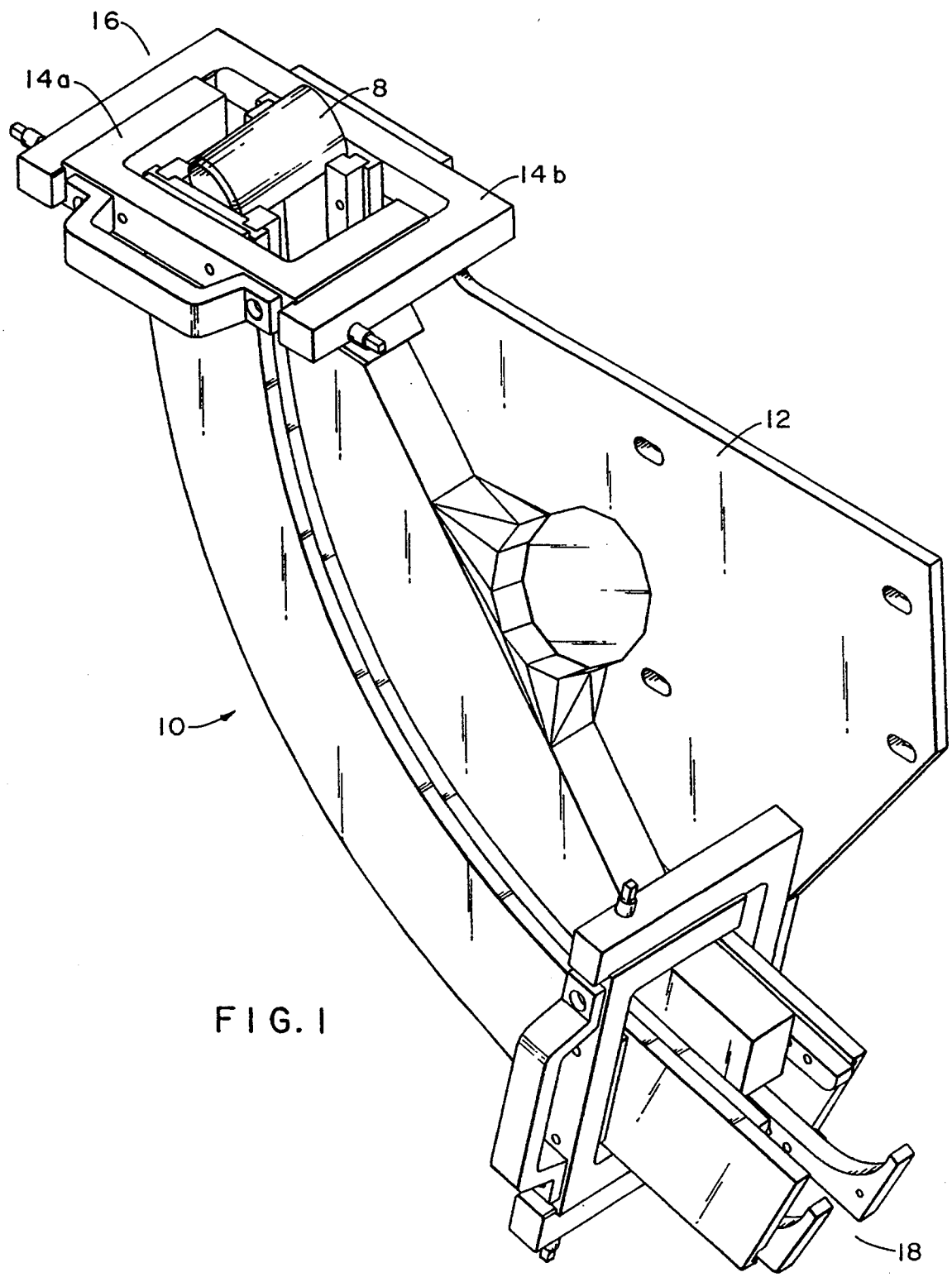
FIG. 1 is an isometric view of the adjustable infeed conveyor.

With reference to FIG. 1, a conveyor apparatus incorporating the features of the instant invention is generally indicated by reference character 10 and includes a supporting frame member 12, a moveable trackwork assembly 14a and a fixed trackwork assembly 14b. Considering FIG. 2 also, the moveable trackwork assembly 14a includes inner collars 70 and 72, first guide track 20 and first and second guide rails 140 and 142. The fixed trackwork assembly 14b includes outer collars 32 and 34, second guide track 22 and third and fourth guide rails 160 and 162. The conveyor 10 has a first end 16 where can bodies 8 enter the trackwork assemblies 14a and 14b and a second end 18 from which the can bodies 8 are discharged. Typically the conveyor apparatus 10 is designed to convey can bodies from a first upstream system, such as a can body maker 1000 to a second downstream location, such as a can decorator 2000 as schematically illustrated in FIG. 5. However, it will be appreciated that the conveyor apparatus of this invention is suitable for use between many types of workstations.

Figure 2:
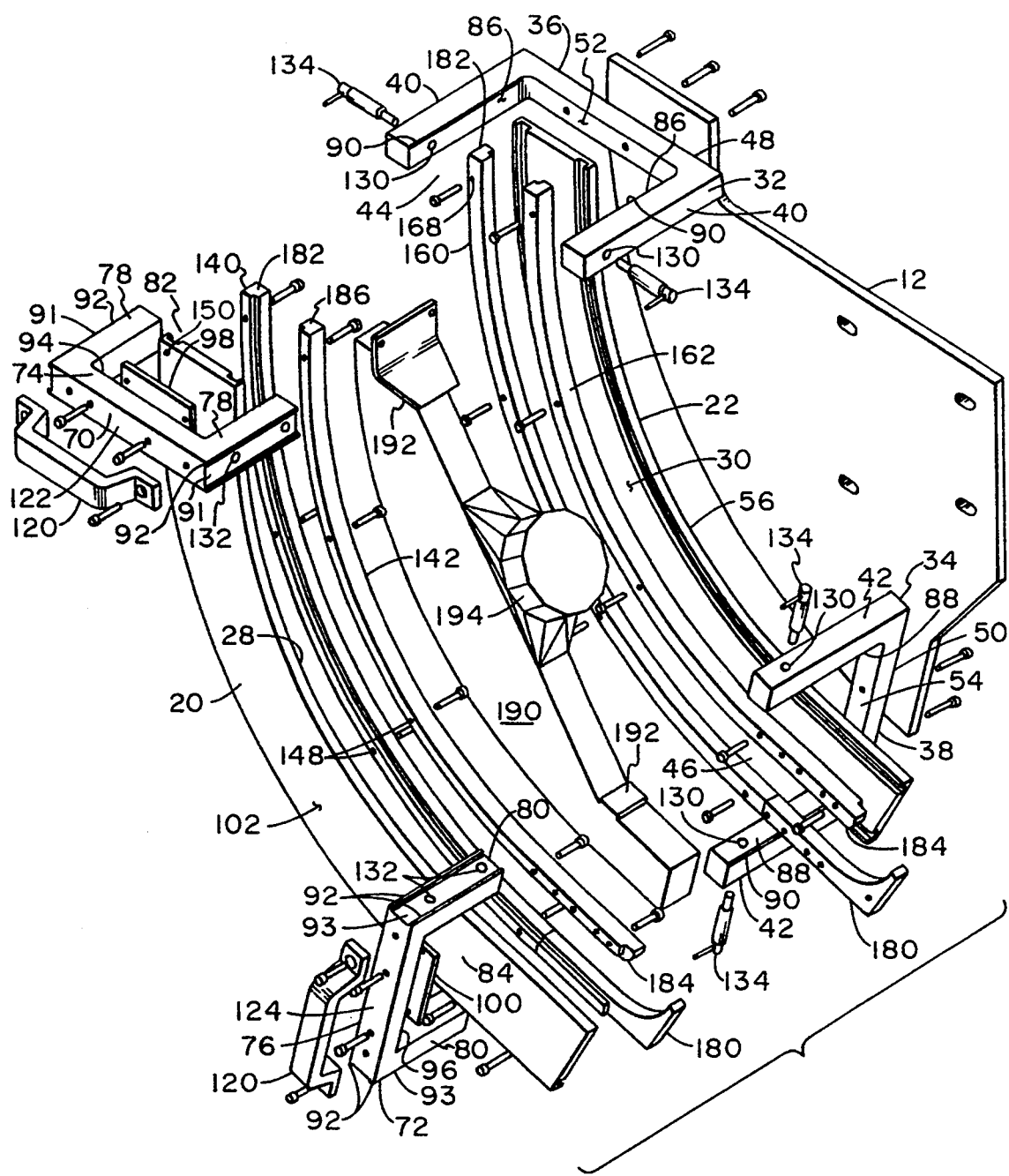
FIG. 2 is an exploded view of the adjustable infeed conveyor.

The supporting frame member 12 is mounted onto a suitable framework (not illustrated) and the trackwork assembly 14b is affixed thereon. With reference to FIG. 2, there is illustrated one segment of the conveyor apparatus 10 suitable for conveying open ended lightweight cans. Each segment of the conveyor apparatus 10 comprises fixed trackwork assembly 14b which includes two outer collars 32 and 34 mounted to supporting frame member 12. These outer collars support the second guide track 22. The outer collars 32 and 34 are spaced apart on the second guide track 22 to provide rigid support.

Each outer collar 32 and 34 includes a center portion 36 and 38, two side rails 40 and 42 and an open side indicated 44 and 46, respectively. The second guide track 22 is supported by the center portion 36 and 38 of each outer collar 32 and 34. The outer surface 48 and 50 of the center portion 36 and 38 of each outer collar 32 and 34 is secured to the supporting frame member 12 while the inner surface 52 and 54 of the center portion 36 and 38 of each outer collar 32 and 34 is fastened to the outer surface 56 of the second guide track 22. The supporting frame member 12, the outer collars 32 and 34 and the second guide track 22 are attached by a conventional means.

Each segment of the conveyor apparatus 10 also includes the moveable trackwork assembly 14a which includes two inner collars 70 and 72. The two inner collars 70 and 72, spaced apart on the first guide track 20 to provide rigid support, slidably engage with the two outer collars 32 and 34 to fasten the guide tracks 20 and 22 into a unified structure. The guide tracks 20 and 22 are mirror images of each other and each has a pair of parallel grooves 24a, 24b and 26a, 26b on its inner surface 28 and 30, respectively. The pair of parallel grooves 24a, 24b and 26a, 26b respectively extend longitudinally along each guide track 20 and 22. The guides tracks 20 and 22 are symmetrically aligned and spaced apart in parallel relation with their inner surfaces 28 and 30 facing each other. The guide tracks can be curved to accommodate the movement of cans at various angles.

Each inner collar 70 and 72 includes respectively a center portion 74 and 76, two side rails 78 and 80 and an open side 82 and 84 for engaging the first guide track 20. The inner collars 70 and 72 and the outer collars 32 and 34 can be coupled by furnishing the outer surfaces 91 and 93 of the inner collars 70 and 72 with a track rail guide 92 and the outer collars 32 and 34 with a track 90. Track 90 is located on the inner surfaces 86 and 88 of outer collars 32 and 34 and engages the track rail guide 92 of the inner collars 70 and 72.

The inner surface 94 and 96 of the center portion 74 and 76 of each inner collar 70 and 72 is detachably affixed to one surface of the spacer plates 98 and 100 while the other surface of the spacer plates 98 and 100 is detachably secured to the outer surface 102 of the first can guide track 20. That is, spacer plates 98 and 100 are placed between each inner collar 70 and 72 and the first can guide track 20. The inner collars 70 and 72, the spacer plates 98 and 100 and the first can guide track 20 are attached by conventional means.

A handle 120 is secured by conventional means to the center portion of the outer surface 122 and 124 of the center portion 74 and 76 of each inner collar 70 and 72. This permits the moveable trackwork assembly 14a to be easily separated from the fixed trackwork assembly 14b when adjustments are required.

Referring also to FIG. 2, the side rails 40 and 42 of the outer collars 32 and 34 have apertures 130 and the side rails 78 and 80 of the inner collars 70 and 72 have a series of apertures 132. By aligning the apertures 130 located on the side rail of the outer collars with one of the series of apertures 132 located on the side rails of the inner collars, the distance between the first can guide track 20 and second can guide track 22 can be determined. The distance between the first and second can guide tracks determines the height can that may be conveyed. Thus, the apertures 130 and 132 can be re-aligned when adjusting the infeed conveyor 10 for different height cans as shown in FIGS. 3A and 3B. FIG. 3A illustrates the set up used for conveyor 10 to move cans of height "A." Cans of height "B" may be conveyed using the set up displayed in FIG. 3B.

Preferably, quick release locking pins 134 are used to secure the inner collars 70 and 72 and the outer collars 32 and 34 in place once the desired position is selected. The locking pins 134 are easily retractable and thus adjustments can be made readily. Other conventional methods may be used in place of locking pins 134 for securing the inner and outer collars. Further, when switching from one set of apertures 132 to another for adjustments, the first can guide track 20 is supported because the track 90 and track rail guides 92 permit the inner collars 70 and 72 and the outer collars 32 and 34, or the fixed trackwork assembly 14b and the moveable trackwork assembly 14a, to remain engaged. That is, it is not necessary to the support the moveable trackwork assembly 14a during adjustments. This allows one operator to make adjustments because the conveyor remains self supporting while changes are being made. This simplifies the adjustment process considerably.

Attached to the inner surface 28 of the first can guide track 20 and a part of the moveable trackwork assembly 14a are the first and second guide rails 140 and 142. As can be more readily appreciated from FIG. 4A and FIG. 4B, these guide rails 140 and 142 each have a tongue 144 and 146 that extends the length of the guide rail. The tongues 144 and 146 define, in part, seats 143 and 145 respectively, also extending the length of each guide rail 140 and 142. The tongues 144 and 146 and seats 143 and 145 allow the guide rails 140 and 142 to fit securely in the grooves 24a and 24b located on the first can guide track 20. Further, there are apertures 148 in both the first and second guide rails 140 and 142 as well as apertures 150 in the first can guide track 20 such that the first and second guide rails 140 and 142 can be detachably fastened to the first can guide track 20. Similarly, the third and fourth guide rails 160 and 162 are attached to the second guide track 22 and are a part of the fixed trackwork assembly 14b. These guide rails also have tongues 164 and 166 and seats 163 and 165 extending their entire length that permit them to fit securely in the grooves 26a and 26b located on the second can guide track 22. Apertures 168 in the third and fourth guide rails 160 and 162, and apertures in collar 32 provide a means to detachably affix the guide rails 160 and 162 to the second guide track 22. The guide rails may be made of a suitable ultra high molecular weight nylon or a low friction material such as polytetrafluoroethylene (PTFE).

Guide rails 140 and 160 may be fitted with a boot shaped piece 180 that aids in directing can travel. The other end 182 of guide rails 140 and 160 is shaped so that it may fit together with conventional trackwork. Guide rails 142 and 162 have one end 184 curved for facilitating smooth can conveyance. The other end 186 of guide rails 142 and 162 is shaped such that it may be fitted to conventional trackwork. The boot shaped piece 180 attaches to guide rails 140 and 160 and the curved end 184 of guide rails 142 and 162 are located near the second end 18 of conveyor 10.

As illustrated in FIG. 4A and FIG. 4B, the detachable guide rails 140, 142, 160 and 162 provide a way to adjust the infeed conveyor 10 for cans of various diameter. The distance between the first and second guide rails 140 and 142, which must be set equal to the distance between the third and fourth guide rails 160 and 162, forms a slot 188 in which one end of the cans being conveyed fit. Likewise, the distance between the third and fourth guide rails 160 and 162 form a slot 188 for the other end of the cans being conveyed. Thus, the distance between the two sets of guide rails 140, 142 and 160, 162 determine what size diameter cans may be carried by the infeed conveyor 10. By rearranging guide rails 140, 142, 160, and 162 as follows, the infeed conveyor 10 may be adjusted for different size diameter cans. FIG. 4A illustrates the guide rails set up such that the infeed conveyor 10 may accommodate cans of diameter "AA." Similarly, FIG. 4B demonstrates the set up used to convey cans of diameter "BB." To adjust infeed conveyor 10, guide rail 140 is removed from groove 24a, rotated 180° clockwise and mounted in groove 26a. Guide rail 142 likewise is removed from groove 24b, rotated 180° clockwise and mounted in groove 26b. Similarly, guide rails 160 and 162 are removed from grooves 26a and 26b, rotated 180° clockwise and respectively mounted in groove 24a and 24b. This rearrangement causes the distance between the guide rails to be increased because of the change in position of seats 143, 145, 163, and 165 located on each guide rail. Rather than seats 143, 145, 163 and 165 being turned inward as they are when the guide rails are in their initial position, they are turned outward after the rearrangement is made. As shown in FIG. 4B, this increases the distance between the two sets of guide rails 140, 142 and 160, 162 and creates a different sized slot 188 for conveying a different diameter can.

An air duct system 190 is used to assist cans along the infeed conveyor 10. The system includes a supporting member 192 which is affixed at one end to a side rail of the inner collar located near the first end 16 of the conveyor. The other end of the supporting member is affixed to a side rail of the outer collar located near the second end 18 of the conveyor. The supporting member 192 is formed and positioned such that when the infeed conveyor is set up, it does not come into contact with the can guide tracks 20 and 22 or the guide rails 140, 142, 160, 162. An air duct 194 is secured in the center of the supporting member 192 such that air can be forced upon the cans to assist them along the conveyor 10. The air duct system 190 facilitates can movement through conveyor 10 in a conventional manner.

The principles of the present invention having now been set forth, it will be apparent to those skilled in the art that certain modifications in structure, components and arrangements of components illustrated herein may be made in the practice of the invention and for the adaptation of the invention to specific applications without departing from the spirit and scope of the invention as defined by the claims which follow.

What is claimed is:

1. An adjustable can conveyor apparatus for transporting a can from a first location to a second location comprising:
   a supporting frame member at least partially extending between said first and second location;
   a fixed trackwork assembly including at least two outer collars mounted on said supporting frame member, each said outer collar having track means;
   a moveable trackwork assembly having at least two inner collars, each said inner collar including track rail guide means that slidably engage said track means of each said outer collar such that said moveable trackwork is supported relative to said fixed trackwork; and
   locking means operatively associated with said outer and inner collars for securing said moveable trackwork in one of at least two predetermined fixed positions relative to said fixed trackwork.

2. An apparatus as recited in claim 1 wherein said locking means comprises:
   a plurality of plungers.

3. An apparatus as recited in claim 1 wherein:
   said moveable trackwork assembly includes a first can guide track supported by and extending between said inner collars.

4. An apparatus as recited in claim 1 wherein:
   said fixed trackwork assembly includes a second can guide track supported by and extending between said outer collars.

5. An apparatus as recited in claim 1 wherein:
   said moveable trackwork assembly includes a first can guide track supported by and extending between said inner collars, said first can guide track having a first and second guide rail mounted thereto; and
   said fixed trackwork assembly includes a second can guide track supported by and extending between said outer collars, said second can guide track having a third and fourth guide rail mounted thereto.

6. An apparatus as recited in claim 1 further comprising:
   an air duct system operatively associated with said fixed trackwork assembly and said moveable trackwork assembly to force air upon said can conveyor to assist said can along said conveyor.

7. An apparatus as recited in claim 1 wherein:
   said moveable trackwork assembly includes a first can guide track supported by and extending between said inner collars; and
   said first can guide track is curved.

8. An apparatus as recited in claim 1, wherein:
   said fixed trackwork assembly includes a second can guide track supported by and extending between said outer collars; and
   said second can guide track is curved.

9. An apparatus as recited in claim 1 further comprising:
   said inner collars each having a center portion having an inner surface; and
   a spacer plate detachably mounted on each said inner surface of said center portion of said inner collars, said spacer plate used to facilitate adjustment of moveable trackwork assembly relative to fixed trackwork assembly.

10. An apparatus as recited in claim 1 further comprising:
    said inner collars each having a center portion having an outer surface; and a handle secured on said outer surface of said center portion of at least one said inner collar, said handle used to move said moveable trackwork assembly in relation to said fixed trackwork assembly.

11. An adjustable can conveyor apparatus for transporting a can from a first location to a second location comprising:

a supporting frame member at least partially extending between said first and second location;

a fixed trackwork assembly including at least two outer collars mounted on said supporting frame member, each said outer collar having track means;

a moveable trackwork assembly having at least two inner collars, each said inner collar including track rail guide means that slidably engage said track means of each said outer collar such that said moveable trackwork is supported relative to said fixed trackwork;

locking means operatively associated with said outer and inner collars for securing said moveable trackwork in at least one predetermined fixed position relative to said fixed trackwork;

a first can guide track supported by and extending between said inner collars and having an inner surface facing said outer collars and two parallel grooves on said inner surface extending the length of said first can guide track;

a second can guide track supported by and extending between said outer collars and having an inner surface facing said inner collars, said second can guide track being in parallel space apart relation to said first can guide track and defining therein two parallel grooves on said inner surface extending the length of said second guide track;

a first and second guide rail detachably mounted to said inner surface of said first can guide track, said first and second guide rails each having a tongue running the length thereof and defining a seat also running the length thereof such that said first and second guide rails fit into said grooves of said first can guide track, said first and second guide rails forming a slot of a predetermined dimension adapted to support said can therein between; and a third and fourth guide rail detachably mounted to said inner surface of said second can guide track, said third and fourth guide rails having a tongue running the length thereof and defining a seat also running the length thereof such that said third and fourth guide rails fit into said grooves of said second can guide track, said third and fourth guide rails forming a slot of a predetermined dimension adapted to support said can therein, said third and fourth guide rails being respectively interchangeable with said first and second guide rails by removing and rotating said first and second guide rails 180° clockwise and exchanging with said third and fourth guide rails also removed and rotated by 180° clockwise defining slots between said first and second guide rails and between said third and fourth guide rails for conveying a different diameter can.

12. An apparatus as recited in claim 11 wherein said locking means comprises:

a plurality of plungers.

13. An apparatus as recited in claim 11 further comprising:

an air duct system operatively associated with said fixed trackwork assembly and said moveable trackwork assembly to force air upon said can conveyor to assist said can along said conveyor.

14. An apparatus as recited in claim 11 wherein:

said first and second can guide track and said first, second, third, and fourth guide rail are curved.

15. An adjustable can conveyor apparatus for transporting a can from a first location to a second location comprising:

a supporting frame member at least partially extending between said first and said second location;

two outer collars mounted on said supporting frame member proximate at said first location and said second location respectively, each said outer collars having first and second parallel side rails extending outwardly from said supporting frame member, said side rails having inner and outer surfaces, said inner surfaces having a track;

two inner collars having first and second parallel side rails extending toward said supporting frame member, said side rails having inner and outer surfaces, said outer surfaces having a track rail guide that slidably engages said track such that said outer collar and said inner collar are securely fastened together;

a locking means operatively associated with said outer collars and said inner collars for securing said moveable trackwork in one of at least two predetermined fixed positions relative to said fixed trackwork;

a first can guide track supported by and extending between said inner collars and having an inner surface facing said outer collars and two parallel grooves on said inner surface extending the length of said first can guide track;

a second can guide track supported by and extending between said outer collars and having an inner surface facing said inner collars, said second can guide track being in parallel space apart relation to said first can guide track and defining therein two parallel grooves on said inner surface extending the length of said second guide track;

a first and second guide rail detachably mounted to said inner surface of said first can guide track, said first and second guide rails each having a tongue running the length thereof and defining a seat also running the length thereof such that said first and second guide rails fit into said grooves of said first can guide track, said first and second guide rails forming a slot of a predetermined dimension adapted to support said can therein between; and a third and fourth guide rail detachably mounted to said inner surface of said second can guide track, said third and fourth guide rails having a tongue running the length thereof and defining a seat also running the length thereof such that said third and fourth guide rails fit into said grooves of said second can guide track, said third and fourth guide rails forming a slot of a predetermined dimension adapted to support said can therein, said third and fourth guide rails being respectively interchangeable with said first and second guide rails by removing and rotating said first and second guide rails 180° clockwise and exchanging with said third and fourth guide rails also removed and rotated by 180° clockwise defining slots between said first and second guide rails and between said third and fourth guide rails for conveying a different diameter can.

16. An apparatus as recited in claim 15 wherein said locking means comprises:
a plurality of plungers.

17. An apparatus as recited in claim 15 further comprising:
an air duct system operatively associated with said fixed trackwork assembly and said moveable trackwork assembly to force air upon said can conveyor to assist said can along said conveyor.

18. An apparatus as recited in claim 15 wherein:
said first and second can guide track and said first, second, third, and fourth guide rail are curved.

19. An apparatus as recited in claim 15 further comprising:
inner collars each having a center portion having an inner surface; and
a spacer plate detachably mounted on each said inner surface of said center portion of said inner collars, said spacer plate used to facilitate adjustment of moveable trackwork assembly relative to fixed trackwork assembly.

20. An apparatus as recited in claim 15 further comprising:
inner collars each having a center portion having an inner surface and an outer surface; and
a handle secured on said outer surface of said center portion of each said inner collar, said handle used to move said moveable trackwork assembly in relation to said fixed trackwork assembly.

* * * * *